US012312559B2

(12) United States Patent
Garbark

(10) Patent No.: US 12,312,559 B2
(45) Date of Patent: May 27, 2025

(54) GLYCEROL AMINOCARBOXYLATE-BASED DETERGENT BUILDERS AND ADDITIVES

(71) Applicant: Battelle Memorial Institute, Columbus, OH (US)

(72) Inventor: Daniel B. Garbark, Blacklick, OH (US)

(73) Assignee: Battelle Memorial Institute, Columbus, OH (US)

( * ) Notice: Subject to any disclaimer, the term of this patent is extended or adjusted under 35 U.S.C. 154(b) by 650 days.

(21) Appl. No.: 17/670,086

(22) Filed: Feb. 11, 2022

(65) Prior Publication Data

US 2022/0275314 A1 Sep. 1, 2022

Related U.S. Application Data

(63) Continuation of application No. PCT/US2020/045936, filed on Aug. 12, 2020.

(60) Provisional application No. 62/885,933, filed on Aug. 13, 2019.

(51) Int. Cl.

| | |
|---|---|
| ***C11D 3/33*** | (2006.01) |
| ***C11D 3/30*** | (2006.01) |
| ***C11D 3/34*** | (2006.01) |
| ***C11D 3/382*** | (2006.01) |
| ***C11D 11/04*** | (2006.01) |

(52) U.S. Cl.

CPC ................ *C11D 11/04* (2013.01); *C11D 3/30* (2013.01); *C11D 3/33* (2013.01); *C11D 3/3409* (2013.01); *C11D 3/349* (2013.01); *C11D 3/382* (2013.01)

(58) Field of Classification Search

CPC .. C11D 3/30; C11D 3/33; C11D 7/265; C11D 2111/12

See application file for complete search history.

(56) References Cited

U.S. PATENT DOCUMENTS

| | | | | |
|---|---|---|---|---|
| 4,351,934 A * | 9/1982 | Kluger | C08G 59/504 528/111 |
| 5,025,103 A * | 6/1991 | Oftring | C07C 229/24 560/171 |
| 2015/0259488 A1* | 9/2015 | Takamoto | C08J 5/2231 521/27 |

FOREIGN PATENT DOCUMENTS

| | | |
|---|---|---|
| GB | 581994 A | 10/1946 |
| GB | 1 448 988 A | 9/1976 |

OTHER PUBLICATIONS

International Search Report and Written Opinion of the International Searching Authority, PCT/US2020/045936, Jan. 22, 2021, 15 pages.

* cited by examiner

*Primary Examiner* — Charles I Boyer

(74) *Attorney, Agent, or Firm* — Grossman, Tucker, Perreault & Pfleger, PLLC; Steven J. Grossman

(57) ABSTRACT

Laundry detergent builder additives are described. Laundry detergent builder additives are water softeners that work to maintain detergent stability and improve the cleaning efficiency of the detergent formulation. These detergent additives also maintain alkalinity that assists cleaning, provides anti-corrosion properties, and helps keep soil from redepositing during washing. The laundry detergent builder additives are functionalized glycerol and soybean meal-based derivatives.

8 Claims, 8 Drawing Sheets

GLYCEROL AMINOCARBOXYLATE-BASED DETERGENT BUILDERS AND ADDITIVES

RELATED APPLICATIONS

This application is a continuation of PCT/US2020/045936, filed Aug. 12, 2020, which claims priority to U.S. Patent Application No. 62/885,933, filed Aug. 13, 2019, the entire disclosures of both of which are hereby incorporated herein by reference.

BACKGROUND AND SUMMARY

Laundry detergent builders are water softeners that work to maintain detergent stability and improve the cleaning efficiency of the detergent formulation. Detergent builders bind metal cations that also work to maintain detergent stability, help keep soil from redepositing during washing, and improve the cleaning efficiency of the detergent formulation. In addition, detergent additives may also maintain alkalinity and provide other properties, such as anti-corrosion and enhanced stain removal properties. Over 13 billion pounds of laundry detergent are used in the U.S. per year, which consists of up to 25% by weight laundry builder additives.

The performance standard for these detergent additives has traditionally been sodium tripolyphosphate (STPP). However, regulators in the United States and Europe have pushed for reduction of phosphate use in detergent. Algal blooms due to builders such as STPP are a serious problem. In addition, European Union regulations have also pushed for increased biodegradability and low toxicity in detergents.

Therefore, there remains a continuing need for alternate laundry builders and additives.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
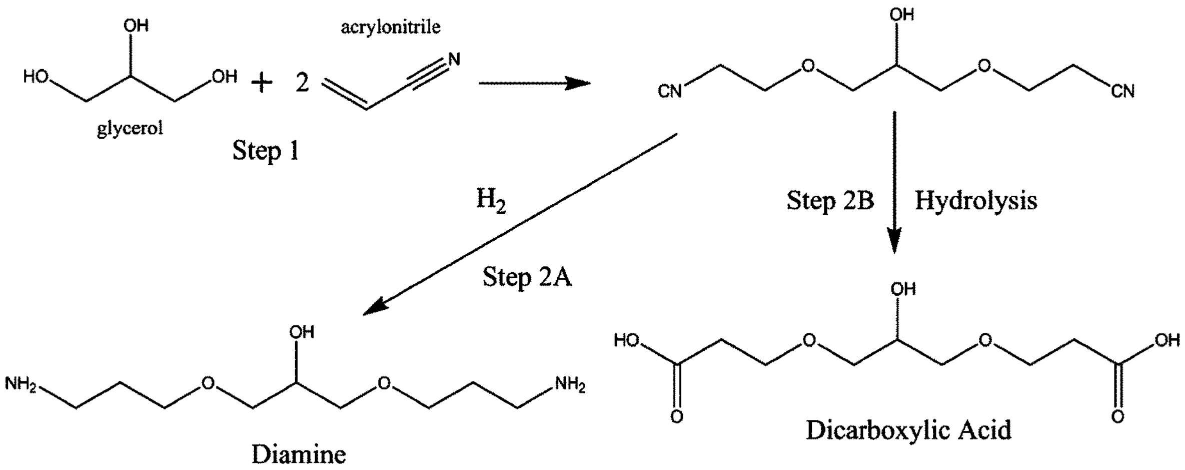
FIG. 1 is a schematic depicting the formation of an etherified glycerol derived intermediate followed by conversion to laundry additives.

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Broadly, methods for the conversion of biobased building blocks to generate highly functionalized builders for detergent applications are described. Methods to utilize glycerol derived from vegetable oils (e.g. soybean oil, olive oil, canola oil, sunflower oil), animal oils (e.g., tallow or fish oils), or algal oils to form an intermediate used as a platform chemical to produce a wide array of builders and additives with unique functionalities has been developed. Methods to utilize soybean flour to produce builders have also been developed. The chemistry can be applied to various purities of glycerol.

Glycerol and soybean meal-based derivatives have been successfully functionalized for use as laundry detergent builders and additives. These laundry detergent builders and additives can be used to replace non-biobased softeners, such as ethylenediamine tetraacetic acid (EDTA) and phosphates, which have been identified as chemicals of concern.

The use of soybean oil components as building blocks for builders and additives typically results in sustainability and biodegradability, which leads to improved water quality.

Glycerol and soy flour derivatives can perform well as builders and additives in laundry detergent applications. During the 1970's, the US was already beginning to look for alternatives to sodium tripolyphosphate (STPP). One potential candidate was 1,2,3-tris(carboxymethoxy)propane sodium salt, also known as glycerol tricarboxylate sodium salt. However, glycerol tricarboxylate sodium salt was not as efficient in chelation by water hardness testing versus STPP and EDTA. Glycerol tricarboxylate sodium salt was previously made using a two-step process in which ethyl diazoacetate is reacted with glycerol to form a tri-ether/triethyl ester of glycerol followed by hydrolysis.

A process for fast and efficient one-step synthesis of glycerol tricarboxylate (Candidate 15), glycerol dicarboxylate (Candidate 16), and glycerol monocarboxylates (Candidate 17) for evaluation was developed. The candidates performed well in calcium chelation testing (Table 1) and liquid laundry testing (Candidate 16; (Table 5)). Table 1 also shows that Candidate 16 performs nearly equivalent to Candidate 15 showing that little is gained by the addition of a third carboxylate group. Table 1 further shows that Candidate 16 performs significantly better than Candidate 17 revealing the dicarboxylate as the most favorable of the three potential products from direct etherification of glycerol. Candidate 18 would be expected to perform like EDTA in formulations.

New builders and additives based on the intermediate formed from reacting glycerol with acrylonitrile have been developed. The increased reactivity of the nitrile groups allows for conversion to many functionalities. These materials are also anticipated to have better environmental sustainability with increased biodegradability.

One aspect of this disclosure is a process for producing glycerol based intermediate. In one embodiment, the method comprises reacting glycerol with an acrylate to form an etherified glycerol intermediate; and reacting the intermediate with a reactant to obtain a functionalized detergent builder.

In some embodiments, the method further comprises hydrolyzing the intermediate under basic or acidic conditions before reacting the intermediate.

In some embodiments, the intermediate is reacted with hydrogen and the functional detergent builder has an amine group.

In some embodiments, the intermediate is reacted with an alcohol, a hydroxy acid, a sulfonic acid ethoxylate, or a sulfonic acid ethoxylate salt.

In some embodiments, the intermediate is reacted with amino acids or salts, amino sulfonic acids or salts, carboxylate amines, or polyamines.

In some embodiments, the amine functional intermediate is reacted with chloroacetic acid in the presence of a base.

In some embodiments, the intermediate is reacted directly with chloroacetic acid in the presence of a base.

In some embodiments, the glycerol is reacted directly with chloroacetic acid in the presence of a base.

In some embodiments, the soy flour is reacted with maleic anhydride or chloroacetic acid.

In some embodiments, the hydroxy acid comprises one or more of citric acid, malic acid, lactic acid, glycolic acid, or tartaric acid, or the hydroxy ester comprises one or more of triethyl citrate, trimethyl citrate, diethyl malate, dimethyl malate, ethyl lactate, methyl lactate, ethyl glycolate, methyl glycolate, ethyl tartrate, or methyl tartrate.

In some embodiments, the amino sulfonic acid comprises one or more of sulfanilic acid, taurine, 4-(aminomethyl) sulfonic acid, or salts thereof.

In some embodiments, the polyamine comprises one or more of ethylene diamine, diethylene triamine, spermidine, spermine, triethylene tetramine, tris (2-aminoethyl) amine, or diaminohexane.

In some embodiments, the carboxylate amine is iminodiacetic acid.

In some embodiments, the glycerol is crude glycerol.

Replacement of builders in liquid laundry detergent formulations is one application. However, the same chemistry can be used to produce builders and additives for other detergent or industrial cleaning applications, such as sequestrants and dishwashing detergents. Other applications for the chemistry taught herein may include polymers and adhesives.

Initial evaluation for the builders was done in stain removal testing and hard water testing. Builders are useful in laundry detergents as they tend to chelate calcium allowing for improved performance of surfactant. Depending on the structure of the builder backbone, the builder can also aid in removal and capturing of stains, thereby decreasing the potential for a stain to redeposit onto the fabric.

The term "crude glycerol" as used herein refers to glycerol derived from vegetable oils, animal fats, or algal oils where water, fatty acids, and salts may still be present.

Etherified glycerol intermediate refers to glycerol that has been etherified with an acrylate, for example acrylonitrile. (Acrylonitrile can be produced from glycerol.) There has recently been great interest in the development of bio-based laundry detergents builders (chelators) and additives for use in detergents and other application such as oil field applications or polymer cross-linkers. One known bio-based chelator is citric acid which has been used for many years to "soften" hard water. However, it has limitations in its use and performance due to lower chelation efficiency.

The approach for synthesizing soybean derived detergent builders is to build molecular weight through etherification of the hydroxyl content with appropriately reactive functionality to form functionalized materials, including polyfunctional materials. The functionality works as the main chelator serving to "soften" by dissolving the metal ions in the water, specifically, calcium. Etherification of the hydroxyl provides improved hydrolytic stability in the backbone structure of the builder compared with esterification. The ether bond is much more hydrolytically stable, thereby maintaining the desired structure during long-term storage under basic conditions. An ester bond would hydrolyze quickly under basic conditions.

Another advantage in utilizing hydrophilic bio-based materials for the builder or additive backbone is that the structure can aid in the removal of hydrophilic stains. These stains include tea, coffee, red wine, and grape juice. Furthermore, use of a soybean meal or flour as the backbone is believed to inhibit stains from being redeposited, allowing for efficient removal.

One example involves the production of carboxylic acid functionality from an acrylate intermediate and soy flour. This functionalization was done to the acrylate intermediate by basic hydrolysis of the nitrile leading to a dicarboxylic acid sodium or potassium salt. The reaction runs quickly, and ammonia was scrubbed from the system. The reaction scheme can be seen in FIG. 1.

Below are examples of the production of the glycerol ether intermediate and all candidates.

All examples herein are merely illustrative of typical aspects of this disclosure and are not meant to limit this disclosure in any way.

Example 1A: This Example Shows a Procedure for Production of the Glycerol Ether Intermediate 4825 mL of tetrahydrofuran (THF; used as solvent/homogenizer), 4.89 Kg of glycerol, and 266.83 g of 50% aqueous potassium hydroxide were loaded into a 5-gallon Mettler RC-1 stirred calorimeter and heated to 50° C. 6.27 Kg of acrylonitrile was fed to the reactor over a 2.5-hour time period controlling the exotherm between 50-65° C. The reaction was stirred for 30 minutes after complete addition. The mixture was then pumped through an ion-exchange resin bed to neutralize the base. THF was removed by vacuum. NMR and IR revealed a complete reaction/etherification of the glycerol primary hydroxyls.

Figure 5:
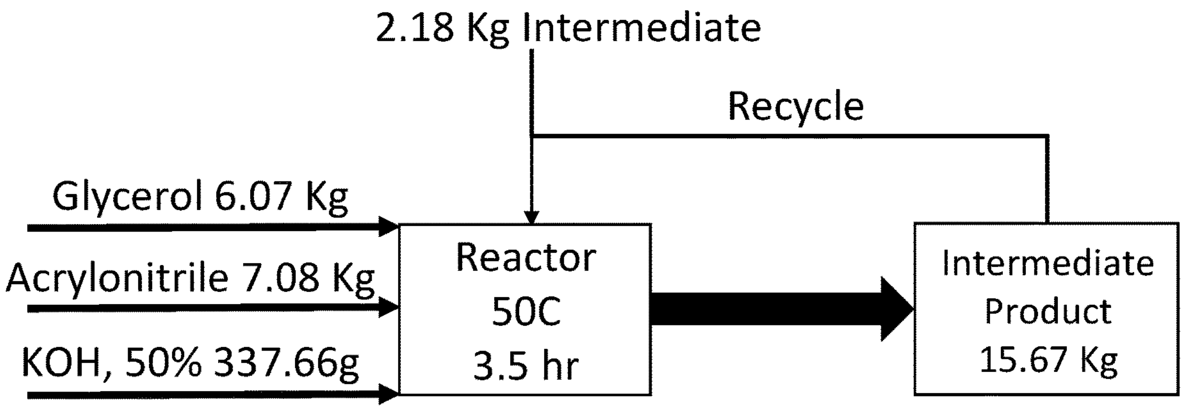
FIG. 5 shows the process for production of an etherified glycerol derived intermediate.

Example 1B: This Example Shows a Procedure for Production of the Glycerol Ether Intermediate Using an Alternate Solvent (FIG. 5)

2.18 Kg of intermediate (used as solvent/homogenizer), 6.07 Kg of glycerol, and 337.66 g of 50% aqueous potassium hydroxide were loaded into a 5-gallon Mettler RC-1 stirred calorimeter and heated to 50° C. 7.08 Kg of acrylonitrile was fed to the reactor over a 3-hour time period controlling the exotherm between 50-65° C. The reaction was stirred for 30 minutes after complete addition. This material was then pumped into a pail for storage. NMR and IR revealed a complete reaction/etherification of the glycerol primary hydroxyls.

Figure 7:
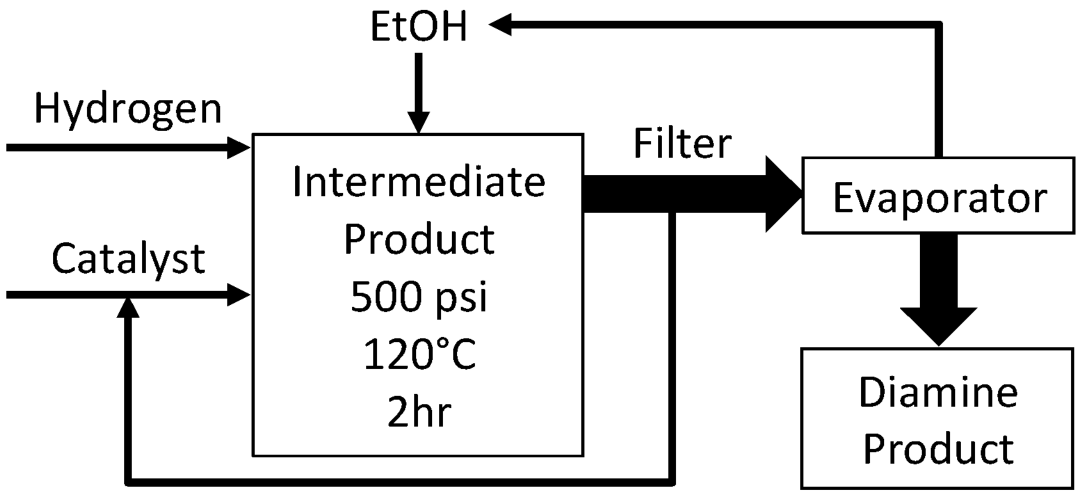
FIG. 7 shows the process for production of Candidate 1, a diamine, from the etherified glycerol derived intermediate.

Example 2: This Example Shows a Procedure for Candidate 1 (FIG. 7)

453.25 g of the etherified glycerol intermediate of Example 1B, 215.21 g of ethanol, and 44.81 g of 60% nickel on silica were weighed into a 1-liter autoclave. The autoclave was pressurized to 550 psi hydrogen and heated to 120° C. The hydrogen pressure was maintained, and the reaction was complete after 2 hours. The mixture was cooled and filtered through a medium fritted filter. The ethanol was removed from the filtrate using evaporation and distillation. The resulting yellow product was a water-soluble oil. IR and pH verified the formation of the expected amine product.

Figure 6:
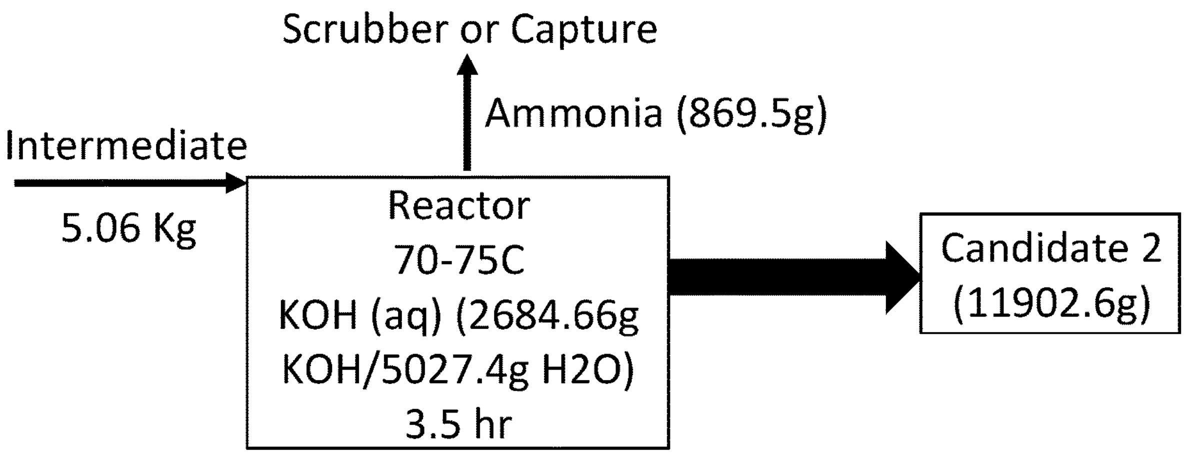
FIG. 6 shows the process for production of Candidate 2 from the etherified glycerol derived intermediate.

Example 3: This Example Shows a Procedure for Making Candidate 2 (FIG. 6)

5.03 Kg of water and 2.68 Kg of potassium hydroxide were added to a 5-gallon Mettler RC-1 stirred calorimeter. 5.06 Kg of intermediate were added over 3 hours, and the ammonia was scrubbed by bubbling reactor exhaust through an acid bath. The mixture was then stirred for 30 minutes to complete the reaction. A sparge was used to remove a trace aroma of ammonia from the product.

Figure 2:
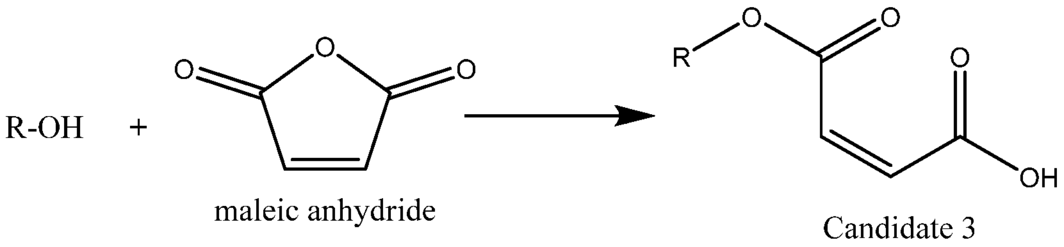
FIG. 2 is a schematic depicting the formation of one embodiment of a builder candidate.

Example 4: This Example Shows a Procedure for Making Candidate 3 (FIG. 2)

172.19 g of soybean flour was mixed in a reactor with 450 mL of ethyl acetate and heated to 75° C. 313.10 g of maleic anhydride was added slowly to mitigate the exotherm from the reaction. The flask neck was rinsed with 50 mL ethyl acetate. Heat was removed after 2 hours. The mixture was filtered and rinsed with 2-200 mL portions of ethyl acetate. The solid was placed into a vacuum oven at 60° C. overnight. The final product weight was 340.19 g of tan powder.

Figure 4:
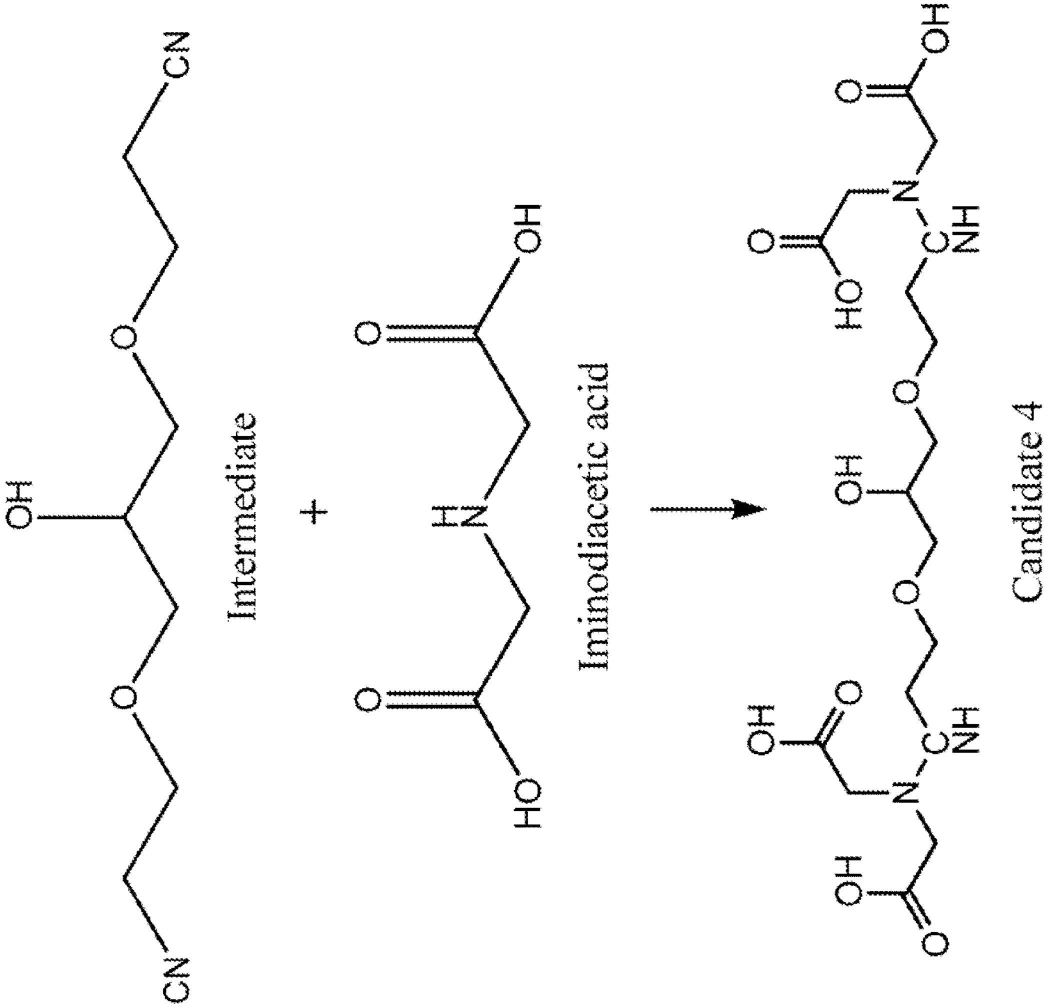
FIG. 4 shows one embodiment of a process for the production of a builder candidate.

Example 5: This Example Shows a Procedure for Making Candidate 4 (FIG. 4)

50.39 g of intermediate were mixed with 66.20 g of iminodiacetic acid, 55.51 g of potassium hydroxide, and 85.45 g water. The mixture was heated to 90° C. and stirred for 2 hours. The resulting product was analyzed by NMR and used without further purification.

Example 6: This Example Shows a Procedure for Making Candidate 5

49.74 g of etherified glycerol intermediate were added dropwise to a mixture of 74.03 g of isethionic acid sodium salt and 250 mL water at 90° C. The reaction was moving slow after 12 hours, so the temperature was raised to 100° C. for 18 hours longer. Because of the slow reaction progress, the mixture was transferred to an autoclave and heated to 150° C. for 10 hours. The resulting NMR analysis verified the reaction of the intermediate and used without further purification.

Example 7: This Example Shows a Procedure for Making Candidate 6

49.80 g of etherified glycerol intermediate were added dropwise to a mixture of 62.59 g of taurine, 19.93 g of sodium hydroxide, and 132.49 g water at 90° C. The reaction was moving slow after 16 hours, so the temperature was raised to 100° C. for 84 hours longer. The resulting product was analyzed by NMR and used without further purification.

Example 8: This Example Shows a Procedure for Making Candidate 7

50.24 g of etherified glycerol intermediate were added dropwise to a mixture of 73.50 g of glutamic acid, 39.89 g of sodium hydroxide, and 163.45 g water at 90° C. After 1 hour, the reaction temperature was raised to 100° C. The reaction was complete after 15 hours. The resulting product was analyzed by NMR and used without further purification.

Example 9: This Example Shows a Procedure for Making Candidate 8

50.28 g of etherified glycerol intermediate were added dropwise to a mixture of 66.61 g of aspartic acid, 39.97 g of sodium hydroxide, and 156.42 g water at 90° C. The reaction temperature was immediately raised to 100° C. The reaction was complete after 20 hours. The resulting product was analyzed by NMR and used without further purification.

Example 10: This Example Shows a Procedure for Making Candidate 10

50.18 g of etherified glycerol intermediate were added dropwise to a flask containing 51.58 g of diethylenetriamine at 60° C. The reaction was complete after 3 hours. The resulting product was analyzed by NMR.

Figure 3:
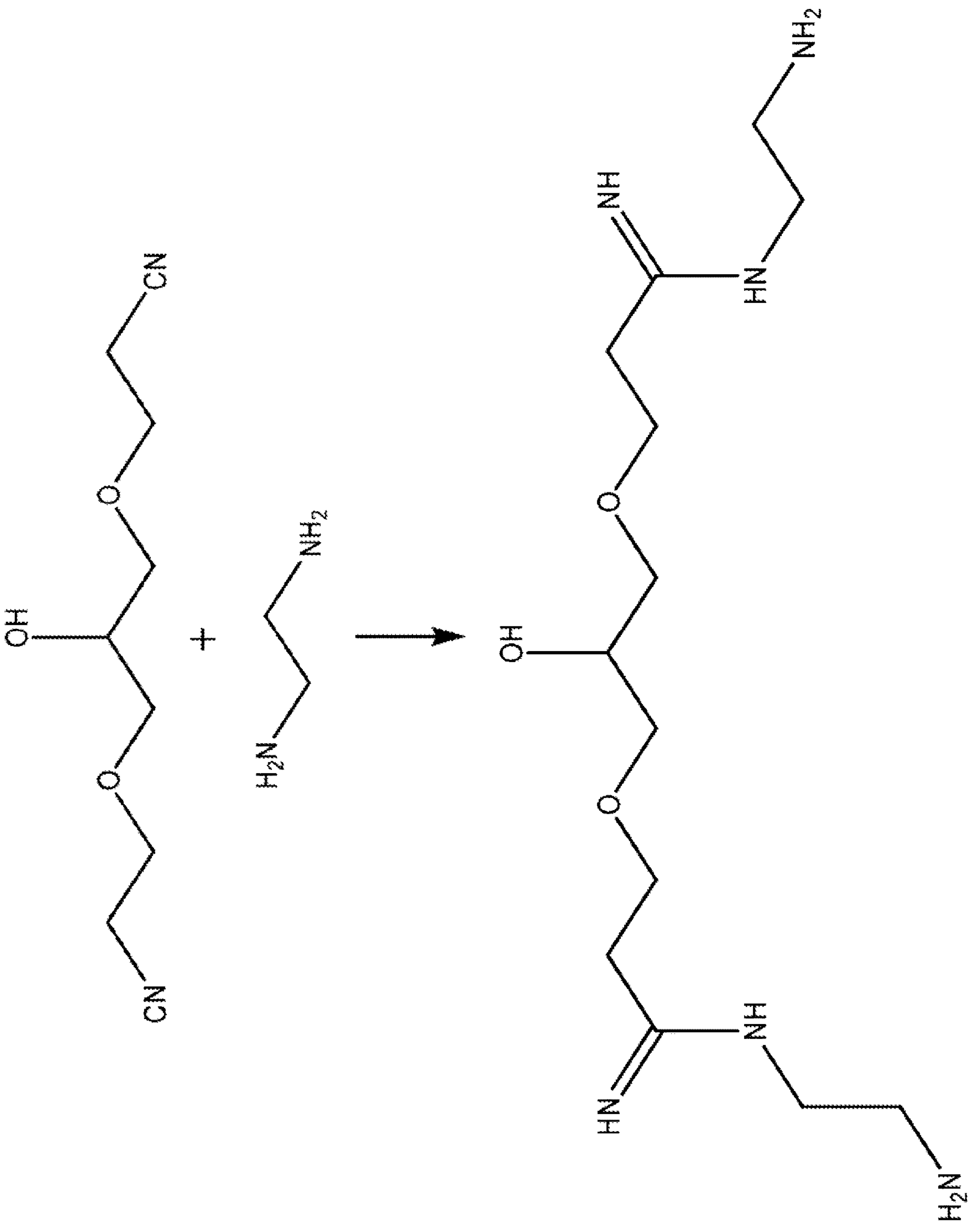
FIG. 3 shows one embodiment of a process for production of Candidate 11 from the etherified glycerol intermediate.

Example 11: This Example Shows a Procedure for Making Candidate 11 (FIG. 3)

49.54 g of etherified glycerol intermediate were added dropwise to a flask containing 30.12 g of ethylenediamine at 60° C. After 6 hours, the reaction temperature was raised to 90° C. The reaction was complete after 4 hours at 90° C. The resulting product was analyzed by NMR.

Example 12: This Example Shows a Procedure for Making Candidate 12

20.02 g of Candidate 10 were weighed into a flask containing 32.40 g of sodium hydroxide and 90.80 g water. 38.38 g of chloroacetic acid was added slowly to the reactor with stirring. After addition, the reaction was raised to 70° C. for 4 hours. The resulting product was analyzed by NMR and used without further purification.

Example 13: This Example Shows a Procedure for Making Candidate 13

20.01 g of Candidate 11 were weighed into a flask containing 30.95 g of sodium hydroxide and 87.50 g water. 36.45 g of chloroacetic acid was added slowly to the reactor with stirring. After addition, the reaction was raised to 70° C. for 5 hours. The resulting product was analyzed by NMR and used without further purification.

Example 14: This Example Shows a Procedure for Making Candidate 14

10.30 g of etherified glycerol intermediate were weighed into a flask containing 9.99 g of sodium hydroxide and 32.05 g water. 11.76 g of chloroacetic acid was added slowly to the reactor with stirring. After addition, the reaction was raised to 70° C. for 40 hours. The resulting product was analyzed by NMR and used without further purification.

Example 15: This Example Shows a Procedure for Making Candidate 15

20.01 g of glycerol were weighed into an autoclave cup containing 54.89 g of sodium hydroxide and 120.65 g water. 64.65 g of chloroacetic acid was added slowly to the reactor with stirring. After addition, the autoclave head was attached, and the reaction was raised to 200° C. for 2 hours. The resulting product was analyzed by NMR and used without further purification.

Figure 8:
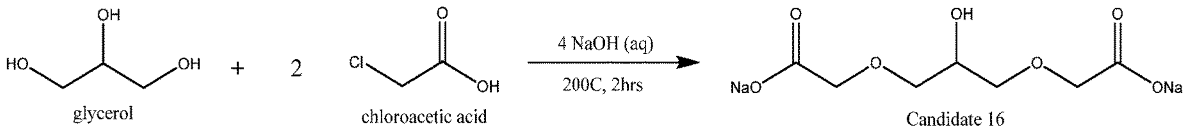
FIG. 8 is a schematic depicting the formation of one embodiment of a builder candidate.

Example 16: This Example Shows a Procedure for Making Candidate 16 (FIG. 8)

25.01 g of glycerol were weighed into an autoclave cup containing 45.69 g of sodium hydroxide and 125.20 g water.

53.87 g of chloroacetic acid were added slowly to the reactor with stirring. After addition, the autoclave head was attached, and the reaction mixture was raised to 200° C. for 2 hours. The resulting product was analyzed by NMR and used without further purification.

Example 17: This Example Shows a Procedure for Making Candidate 17

35.00 g of glycerol were weighed into an autoclave cup containing 33.45 g of sodium hydroxide and 125.20 g water. 39.51 g of chloroacetic acid were added slowly to the reactor with stirring. After addition, the autoclave head was attached, and the reaction mixture was raised to 200° C. for 2 hours. The resulting product was analyzed by NMR and used without further purification.

Example 18: This Example Shows a Procedure for Making Candidate 18

50.12 g of soy flour were weighed into a flask containing 88.90 g of sodium hydroxide and 501.21 g water. The reactor was then heated to 90° C., and 104.96 g of chloroacetic acid were added slowly to the reactor with mechanical stirring. After addition, the reactor was held at 90° C. for 7 hours, followed by 3 hours at 95° C. The mixture was then filtered at ambient temperature through a ¼" bed of celite to remove the trace solids that precipitated at room temperature. The resulting filtrate product was analyzed by NMR and used without further purification.

Table 1 shows the hard water testing (Sanitation: Cleaning and Disinfection in the Food Industry By Mario Stanga) results of all candidates and the comparison to standards. The theoretical column in Table 1 was obtained by calculating the functionality per gram sample as compared with STPP. Table 2 shows the stain removal testing of Candidate 2 in a powder formulation versus the standard formulation containing STPP. The difference calculated shows positive, negative, or no significant difference in stain removal. Table 3 shows the stain removal on limited stains of Candidates 2, 3, 1 with 2, and 4 in a powder formulation. The limited stains were chosen based on lower performance in earlier testing. Table 4 shows the stain removal performance of Candidate 3 in a powder formulation versus the standard formulation. Table 5 shows the stain removal performance of Candidates 14 and 16 in a liquid formulation versus the standard EDTA formulation.

Although Candidate 2 performed well in stain testing of a powder formulation, seen in Table 2, the candidate did not work well as a chelator as measured in hard water testing (Table 1).

TABLE 1

| Water Hardness Testing<br>Water Hardness Testing $Ca^{2+}/CO3^{2-}$ | | | |
|---|---|---|---|
| Candidate | Description | Theoretical | ActualTitration |
| STPP | Standard | 0.53 | 0.49 |
| EDTA | Standard | 0.42 | 0.53 |
| 1 | Glyceryl Diether Diamine | 0.38 | N/A |
| 2 | Glyceryl Diether Dicarboxylate Sodium Salt | 0.28 | 0.12 |
| 3 | Soy Flour Functionalized with Maleic Anhydride | NA | 0.15 |
| 4 | Glyceryl Diether Diiminodiacetic Sodium Salt | 0.42 | 0.4 |
| 5 | Glyceryl Diether Diiminoisethionic Sodium Salt | 0.16 | N/A |
| 6 | Glyceryl Diether Diiminotaurinate Sodium Salt | 0.32 | 0.05 |
| 7 | Glyceryl Diether Diiminoglutamate Sodium Salt | 0.40 | 0.1 |
| 8 | Glyceryl Diether Diiminoaspartate Sodium Salt | 0.42 | 0.16 |
| 9 | Glyceryl Diether DiCitrate Sodium Salt | 0.40 | N/A |
| 10 | Glyceryl Diether Bis(diethylenetriamine imideamide) | 0.19 | 0.08 |
| 11 | Glyceryl Diether Bis(ethylenediamineimideamide) | 0.24 | 0.11 |
| 12 | Glyceryl Diether Octacarboxylate Sodium Salt | 0.37 | 0.42 |
| 13 | Glyceryl Diether Hexacarboxylate Sodium Salt | 0.40 | 0.75 |
| 14 | Glyceryl Diether Tetracarboxylate Sodium Salt | 0.30 | 0.27 |
| 15 | Glycerol Tricarboxylate Sodium Salt | 0.35 | 0.32 |
| 16 | Glycerol Dicarboxylate Sodium Salt | 0.31 | 0.32 |
| 17 | Glycerol Monocarboxylate Sodium Salt | 0.23 | 0.13 |
| 18 | Soyflour Carboxylate Sodium Salt | 0.28 | 0.57 |

TABLE 2

| Round 1 Powder Formulation | | | | | |
|---|---|---|---|---|---|
| ASTM D4265 | | | Average of Stain Removal Index % (SRI) | | |
| Stain | Category | LSD | Standard | Candidate 2 | Difference |
| Tea without Milk | Bleachable | 4.3 | 28.8 | 6.2 | −22.6 |
| Coffee without Milk | Bleachable | 4.7 | 68.1 | 79.2 | 11.1 |
| Tea with Milk | Bleachable | 5.4 | 42.8 | 19.1 | −23.7 |
| Coffee with Milk | Bleachable | 3 | 62.1 | 74.8 | 12.7 |
| Red Wine | Bleachable | 3 | 45.1 | 40.2 | −4.9 |
| Grape Juice | Bleachable | 2.6 | 63.7 | 67.7 | 4 |
| Blueberry | Bleachable | 3.1 | 68.7 | 79.5 | 10.8 |
| Blue Ink | Bleachable | 3.8 | 78.3 | 100.0 | 21.7 |

TABLE 2-continued

| Round 1 Powder Formulation | | | | | |
|---|---|---|---|---|---|
| ASTM D4265 | | | Average of Stain Removal Index % (SRI) | | |
| Stain | Category | LSD | Standard | Candidate 2 | Difference |
| Sheep Blood | Enzymatic | 2.3 | 73.8 | 96.5 | 22.7 |
| Chocolate Ice Cream | Enzymatic | 3.5 | 46.6 | 62.9 | 16.3 |
| Mustard | Enzymatic | 2.5 | 69.4 | 85.0 | 15.6 |
| Spaghetti Sauce | Enzymatic | 4.6 | 66.4 | 74.4 | 8 |
| Gravy | Enzymatic | 4.5 | 79.1 | 90.7 | 11.6 |
| Chocolate Syrup | Enzymatic | 4.9 | 53.6 | 62.3 | 8.7 |
| Scrubbed Grass | Enzymatic | 2.2 | 48.1 | 50.1 | 2 |
| Meat Drippings | Enzymatic | 5.5 | 6.5 | 0.0 | −6.5 |
| Makeup | Greasy | 5.2 | 29.6 | 28.4 | −1.2 |
| Sebum + Carbon Black | Greasy | 4 | 71.8 | 94.2 | 22.4 |
| Oil | Greasy | 8.3 | 46.8 | 57.5 | 10.7 |
| Butter | Greasy | 3.4 | 71.5 | 65.9 | −5.6 |
| DMO | Greasy | 4.4 | 42.3 | 55.3 | 13 |
| Clay | Particulate | 3.3 | 57.9 | 72.9 | 15 |
| Mud | Particulate | 1.8 | 53.5 | 67.8 | 14.3 |
| | | | | | Good |
| | | | | | No Difference |
| | | | | | Poor |

TABLE 3

| Round 2 Powder Formulation on Limited Stains | | | | | | | |
|---|---|---|---|---|---|---|---|
| | | | Sample 1 STPP | Sample 2 Candidate 2 | Sample 3 Candidate 3 | Sample 4 Candidate 1 + 2 | Sample 5 Candidate 4 |
| Stain | Reference | Category | Average Difference From Standard of Stain Removal Index % (SRI) | | | | |
| Tea without Milk | ASTM TKC | Bleachable | 0 | −6.2 | 19.8 | −5.4 | −6.9 |
| Tea with Milk | ASTM TKC | Enzymatic | 0 | −14.2 | 24.8 | −5.5 | −5.2 |
| Meat Drippings | ASTM TKC | Enzymatic | 0 | −5.9 | −3.3 | 7 | 3.4 |
| Butter | ASTM TKC | Greasy | 0 | −4.7 | 0 | 5.2 | −0.9 |
| | | | | | | | Good |
| | | | | | | | No Difference |
| | | | | | | | Poor |

TABLE 4

| Round 3 Powder Formulation | | | | |
|---|---|---|---|---|
| ASTM D4265 | | Average of Stain Removal Index % (SRI) | | |
| Stain | Category | Candidate 3 | STPP | Difference |
| Tea without Milk | Bleachable | −27.7 | −34.7 | 7.0 |
| Coffee without Milk | Bleachable | 33.1 | 29.7 | 3.4 |
| Tea with Milk | Bleachable | −7.3 | −12.4 | 5.1 |
| Coffee with Milk | Bleachable | 39.6 | 35.0 | 4.6 |
| Red Wine | Bleachable | 38.9 | 35.3 | 3.6 |
| Grape Juice | Bleachable | 46.2 | 42.9 | 3.3 |
| Blueberry | Bleachable | 49.4 | 48.1 | 1.3 |
| Blue Ink | Bleachable | 23.5 | 23.1 | 0.4 |
| Sheep Blood | Enzymatic | 92.4 | 93.0 | 0.6 |
| Chocolate Ice Cream | Enzymatic | 71.2 | 71.9 | 0.7 |
| Mustard | Enzymatic | 76.1 | 77.3 | 1.2 |
| Spaghetti Sauce | Enzymatic | 62.1 | 68.0 | 5.9 |
| Gravy | Enzymatic | 89.1 | 85.5 | 3.6 |
| Chocolate Syrup | Enzymatic | 85.6 | 85.6 | 0.0 |
| Scrubbed Grass | Enzymatic | 13.6 | 13.4 | 0.2 |
| Meat Drippings | Enzymatic | 9.5 | 7.4 | 2.1 |
| Makeup | Greasy | 24.7 | 18.5 | 6.2 |
| Sebum + Carbon Black | Greasy | 25.1 | 22.0 | 3.1 |
| Oil | Greasy | 12.0 | 24.0 | 12.0 |
| Butter | Greasy | 52.4 | 48.7 | 3.7 |
| DMO | Greasy | 11.2 | 8.2 | 3.0 |
| Clay | Particulate | 69.4 | 66.9 | 2.5 |
| Mud | Particulate | 83.7 | 84.0 | 0.3 |
| | Total Removal | 973.8 | 941.4 | Good |
| | | | | No Difference |
| | | | | Poor |

TABLE 5

| Round 4 Liquid Formulation ASTM D4265 Stain Removal Testing | | | |
|---|---|---|---|
| Stains on Cotton | EDTA Standard | Candidate 16 | Candidate 14 |
| Clay | 51.0 | 62.1 | 54.7 |
| Coffee | 63.9 | 63.2 | 58.6 |
| Dust Sebum | 73.3 | 67.8 | 72.6 |
| EMPA 101 | 7.5 | 6.9 | 6.1 |

TABLE 5-continued

| Round 4 Liquid Formulation ASTM D4265 Stain Removal Testing | | | |
|---|---|---|---|
| Stains on Cotton | EDTA Standard | Candidate 16 | Candidate 14 |
| EMPA 112 | 10.1 | 7.8 | 9.6 |
| EMPA 116 | 26.6 | 27.7 | 23.9 |
| Grass | 76.1 | 73.8 | 73.7 |
| Make Up | 64.1 | 66.6 | 59.5 |
| Red Wine | 56.8 | 50.7 | 52.5 |
| Spaghetti Sauce | 83.1 | 82.0 | 84.5 |
| Total Stains Removed | 512.5 | 508.6 | 495.7 |

As seen in Table 1, some candidates do not perform as well as theoretical, while others do. The likely reason for EDTA performing higher than calculated may be due to the test being visual, leading to slight discrepancies. However, the test did verify candidates that chelate well. Some of the candidates that did not perform chelation were structures such as the sulfonates. While the sulfonates may be useful as additives for the removal of specific stains, they are not useful in chelation as seen by the low titrated values versus theoretical in Table 1.

The functionalization of the intermediate with amino acids (glutamic and aspartic) was then evaluated. These materials did not perform well as chelators, likely due to lower efficiency of the amino acids.

Polyamines were reacted with the intermediate to produce polyamine functionality. These products did not chelate well but would be useful as corrosion inhibitors. The amine functionality was also found to improve the removal of fatty stains, such as meat drippings and butter, as seen by the addition of Candidate 1 to the formulation in Table 3.

Because the carboxylate salts and sulfonates did not perform well, alternative candidates were produced. The amine of iminodiacetic acid was reacted with the nitrile groups producing Candidate 4, which was a good chelating product, as seen in Table 1.

Functionalizing the polyamine products by the reaction with chloroacetic acid led to greatly improved chelation. This can be seen in Candidates 12 and 13 in Table 1. Similar functionality could be obtained from the direct reaction of chloroacetic acid with the intermediate to produce a tetra-acid terminated product Candidate 14 (FIG. 4).

The glycerol content was increased by reacting chloroacetic acid directly with glycerol (bypassing the intermediate formation). The trifunctional product of glycerol and chloroacetic made using a two-step process is used industrially (Candidate 15). However, in our autoclave one-step process the reaction can be completed in as little as 2 hours. The ratio of chloroacetic acid to glycerol was controlled to produce a difunctional candidate Candidate 16, and a monofunctional candidate, Candidate 17. By controlling the ratio, the glycerol content can be greatly increased. However, by reducing functionality on a weight basis more of the product must be used for equivalent performance to standards.

Candidate 3, which is a powder created from the reaction of soy flour and maleic anhydride, also performed well in stain testing (as seen in Table 4). However, Candidate 3 is hazy in water, due to trace amounts of low water-soluble components, and did not perform as expected in chelation testing likely due to the longer chains of maleic acid. To improve Candidate 3, soy flour was reacted directly with chloroacetic acid (forming an ether linkage) to create a water soluble carboxymethylcellulose type chelator, labeled Candidate 18. As seen in Table 1, Candidate 18 had greatly improved chelation compared to Candidate 3.

Two candidates and the standard EDTA were also evaluated in low builder liquid formulations to determine efficacy. These standard formulations used 2.6% by wt of builder. Slight adjustments to the builder weights were made for equivalent functionality in the systems. The stain removal results can be seen in Table 5. The variation between lowest to highest stain removal is within the test deviation. Therefore, both Candidate 14 and 16 performed equivalent in efficiency based on the equal functionality to EDTA in these formulations.

In addition to biodegradability and sustainability, the use of glycerol and soy flour as feedstocks also has cost implications. Crude glycerol from biodiesel production can be utilized to create equivalent intermediate structures. The trace fatty acids and salts would remain as additives to the builders. It is also likely that soybean meal and hulls could be used in equivalent fashion to the soy flour.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for producing a glycerol-based detergent builder having an end group of an aminocarboxylate or salt thereof, comprising:

(a) reacting glycerol with one or more nitriles comprising acrylonitrile, but-3-enenitrile, pent-4-enenitrile, hex-5-enenitrile, and chloroacetonitrile to form an etherified glycerol intermediate having terminal cyano groups;

(b) reacting the terminal cyano groups of said etherified glycerol intermediate with ethylene diamine or diethylene triamine thereby providing terminal amino groups; and reacting the terminal amino group in the product of step (b) with chloroacetic acid in the presence of a base and forming end groups on said etherified glycerol intermediate comprising an aminocarboxylate group or salt thereof detergent builder.

2. The method of claim 1 wherein said one or more nitriles comprises acrylonitrile.

3. The method of claim 1 wherein said one or more nitriles comprises but-3-enenitrile.

4. The method of claim 1 wherein said one or more nitriles comprises pent-4-enenitrile.

5. The method of claim 1 wherein said one or more nitriles comprises hex-5-enenitrile.

6. The method of claim 1 wherein said etherified glycerol intermediate having terminal cyano groups formed in step (a) comprises the following structure:

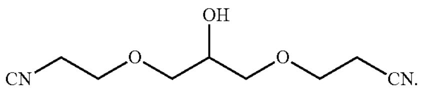

7. The method of claim 1 wherein in step (b), the following intermediate is formed having terminal amino groups:

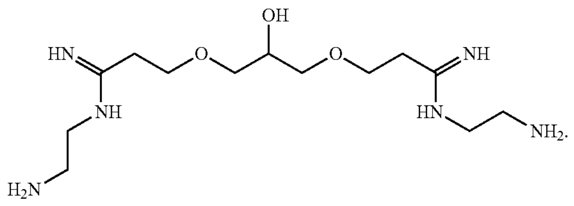 [SMILES: N=C(CCOCC(O)COCCC(=N)NCCN)NCCN]
8. The method of claim 1 wherein reacting of the terminal amino group in the product of step (b) with chloroacetic acid in the presence of a base comprises reacting in the presence of sodium hydroxide.
* * * * *